United States Patent
Zank et al.

(10) Patent No.: US 7,693,312 B2
(45) Date of Patent: *Apr. 6, 2010

(54) METHOD FOR AUTHENTICATING AN ELECTRONIC SIGNATURE

(75) Inventors: Anthony E. Zank, Simi Valley, CA (US); Paul M. Zank, Simi Valley, CA (US)

(73) Assignee: Topaz Systems, Inc., Simi Valley, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/569,551

(22) PCT Filed: Jan. 10, 2005

(86) PCT No.: PCT/US2005/000650

§ 371 (c)(1),
(2), (4) Date: Dec. 13, 2006

(87) PCT Pub. No.: WO2005/119579

PCT Pub. Date: Dec. 15, 2005

(65) Prior Publication Data

US 2007/0248247 A1    Oct. 25, 2007

Related U.S. Application Data

(63) Continuation-in-part of application No. 10/855,695, filed on May 26, 2004, now Pat. No. 7,190,815.

(51) Int. Cl.
*G06K 9/00* (2006.01)

(52) U.S. Cl. .................. 382/119; 382/115; 382/120; 382/188; 382/200; 382/218; 713/176; 713/186

(58) Field of Classification Search .......... 382/115, 382/119, 120, 121, 122, 123, 188, 200, 201, 382/218, 219; 348/161; 713/176, 186; 73/865.4; 178/18.01, 18.03, 19.01, 19.04
See application file for complete search history.

(56) References Cited

U.S. PATENT DOCUMENTS

| | | | |
|---|---|---|---|
| 5,872,848 A | 2/1999 | Romney et al. | |
| 5,892,824 A | 4/1999 | Beatson et al. | |
| 6,298,154 B1 | 10/2001 | Cok | |
| 6,307,955 B1 * | 10/2001 | Zank et al. | 382/121 |
| 6,640,007 B1 | 10/2003 | Niie et al. | |
| 6,836,267 B1 | 12/2004 | Endo et al. | |
| 7,190,815 B2 * | 3/2007 | Zank et al. | 382/119 |
| 2004/0193543 A1 * | 9/2004 | Nord et al. | 705/50 |

OTHER PUBLICATIONS

Notice of Allowance and Issue Fee(s) Due mailed Oct. 30, 2006 U.S. Appl. No. 10/855,695, filed May 26, 2004.
Notice of Allowance and Issue Fee(s) Due mailed Jun. 21, 2006 U.S. Appl. No. 10/855,695, filed May 26, 2004.
Office Action mailed Apr. 21, 2006 U.S. Appl. No. 10/855,695, filed May 26, 2004.
Office Action mailed Nov. 8, 2005 U.S. Appl. No. 10/855,695, filed May 26, 2004.
Office Action mailed Aug. 25, 2005 U.S. Appl. No. 10/855,695, filed May 26, 2004.
Office Action mailed Mar. 22, 2005 U.S. Appl. No. 10/855,695, filed May 26, 2004.
International Preliminary Report on Patentability and Written Opinion of the International Searching Authority mailed Dec. 7, 2006 International Application No. PCT/US2005/000650, International Filing Date: Jan. 10, 2005.
International Search Report and Written Opinion of the International Searching Authority dated Apr. 26, 2005 International Application No. PCT/US2005/000650, International Filing Date: Jan. 10, 2005.

* cited by examiner

*Primary Examiner*—Bhavesh M Mehta
*Assistant Examiner*—Stephen R Koziol
(74) *Attorney, Agent, or Firm*—Sheldon Mak Rose & Anderson PC; Denton L. Anderson

(57) ABSTRACT

A method for determining whether a disputed electronic signature is that of a purported signator includes the steps of (a) creating in a single step an ink on paper signature and an identical electronic signature of the purported signator; (b) verifying that the ink on paper signature is consistent with known ink on paper signatures of the purported signator; and (c) comparing the disputed electronic signature with the electronic signature of the purported signature to determine whether the disputed electronic signature is that of the purported signator.

13 Claims, No Drawings

METHOD FOR AUTHENTICATING AN ELECTRONIC SIGNATURE

CROSS-REFERENCE TO RELATED APPLICATION

The present Application is a 371 of International Patent Application No. PCT/US2005/00650 titled "Method for Authenticating an Electric Signature" filed Jan. 10, 2005 which is a continuation-in-part of U.S. patent application Ser. No. 10/855,695 filed May 26, 2004, now U.S. Pat. No. 7,190,815 entitled "Method For Authenticating an Electronic Signature," the contents of which are incorporated in this disclosure by reference in their entirety.

FIELD OF THE INVENTION

This invention relates generally to methods for authenticating signatures and, more specifically, to methods for authenticating electronic signatures.

BACKGROUND OF THE INVENTION

Electronic (digitized) signatures are becoming increasingly common in the execution of contracts, the payment for commercial transactions, and in many other aspects of commerce A necessary component for the utility and acceptance of electronic signatures is the ability to authenticate such signatures. Many such authentication procedures have been proposed, such as that disclosed in U.S. Pat. No. 6,307,955, the entirety of which is incorporated by this reference.

All known prior art authentication methods, however, required the existence of an established reference signature in electronic form. There are many circumstances, however, where such established reference signatures in electronic form is not available and is no longer obtainable. Accordingly, there is a need for a method for verifying an electronic signature where a verified signature may not be available.

SUMMARY

The invention satisfies this need. The invention is a method for determining whether a disputed electronic signature is that of a purported signator. The method comprises the steps of (a) creating in a single step an ink on paper signature and an identical electronic signature of the purported signator; (b) verifying that the ink on paper signature is consistent with known ink on paper signatures of the purported signator; and (c) comparing the disputed electronic signature with the electronic signature of the purported signator to determine whether the disputed electronic signature is that of the purported signator.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a method for determining whether a disputed electronic signature is that of a purported signator. The method comprises the steps of (a) creating in a single step an ink on paper signature and an identical electronic signature of the purported signator; (b) verifying that the ink on paper signature is consistent with known ink on paper signatures of the purported signator; and (c) comparing the disputed electronic signature with the electronic signature of the purported signator to determine whether the disputed electronic signature is that of the purported signator.

In one embodiment of the invention, step (a) of the method is repeated one or more times to create a plurality of signature pairs wherein each signature pair is the creation in a single step of an ink-on-paper signature and an identical electronic signature of the purported signator. In this embodiment, the several paper signatures created in step (a) are compared with known ink-on-paper signatures of the purported signator in step (b). Also in this embodiment, the several electronic signatures created in step (a) are compared with the disputed signature in step (c) to determine whether the disputed electronic signature is that of the purported signator. Step (c) in this embodiment can be carried out by a digital computer program. Such program can be designed to compare the several electronic signatures created in step (a) using statistical analysis techniques.

The creation of an ink-on-paper signature and an identical electronic signature of the purported signator can be accomplished in many ways. In one way, a piece of ordinary paper is placed over a touch sensitive pad connected to a computer. The signator signs his or her name with an ordinary ink pen writing on the paper. An electronic signature is simultaneously obtained via the pressure of the ink pen against the touch sensitive pad. Another way of creating an ink-on-paper signature and an identical electronic signature is with an electronic pen having a built-in ink cartridge. A piece of ordinary paper is placed onto an active area of an electronic pen tablet. Software within the computer is adapted to capture the signature data from the tablet while the ink cartridge within the electronic pen yields an ink-on-paper signature.

The electronic signature can also be obtained with an electronic pen which reads microscopic coordinates on paper or one that senses position without the need of a corresponding tablet, such as by using infrared sensors or other kind of pen tip sensing.

In one example of the invention, the method of the invention is used to determine whether a disputed signature is that of an alleged signator. The creation of an ink-on-paper signature and an identical electronic signature is carried out in the presence of a neutral third party, such as a mediator in a mediation proceeding, a court reporter in a pre-trial discovery proceeding or a judge in a litigation proceeding. The ink-on-paper signature is then compared to known ink-on-paper signatures of the alleged signator by a handwriting specialist using known handwriting forensic techniques. Once the ink-on-paper signature is confirmed to be consistent with known ink-on-paper signatures of the alleged signator, the disputed electronic signature is compared with the electronic signature prepared in step (a) by known comparison techniques to determine whether the disputed electronic signature is that of the alleged signator.

The method of the invention has the additional advantage in this situation that, if the alleged signator attempts to disguise his or her signature during the creation of the ink-on-paper signature and an identical electronic signature in step (a), this fact will be determined in step (b) when the ink-on-paper signature prepared in step (a) is found to be inconsistent with known ink-on-paper signatures of the alleged signator.

In another example of the invention, the signer of an electronic signature in a commercial transaction or in the execution of a legal document, such as a will. The signator is asked at the time of execution to prepare, in a separate step, an ink-on-paper signature and an identical electronic signature in step (a). Both the ink-on-paper signature and the identical electronic signature prepared in step (a) are retained in a file. Thereafter, when and if the authenticity of the electronic signature on the commercial transaction or legal document is questioned, the ink-on-paper and the identical electronic signature prepared in step (a) is extracted from the file. The ink-on-paper signature is compared to known ink-on-paper signatures to verify that the ink-on-paper is that of the purported signator.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A method of verifying whether a disputed electronic signature is that of a signator, comprising the steps of:
    (a) obtaining a first ink on paper signature from the signator for reference;
    (b) obtaining a first electronic signature in connection with a transaction;
    (c) obtaining, in a single step using a touch sensitive pad connected to a computer, a second ink on paper signature and a second electronic signature from an individual, wherein the second ink on paper signature and the second electronic signature are identical;
    (d) comparing the first ink on paper signature with the second ink on paper signature to determine whether the first ink on paper signature is consistent with the second ink on paper signature and thereby verify whether the individual is the signator; and
    (e) comparing the first electronic signature with the second electronic signature to determine whether the first electronic signature is consistent with the second electronic signature and thereby verify whether the individual is the author of the first electronic signature.

2. The method of claim 1, wherein the first ink on paper signature is consistent with the second ink on paper signature and the individual is confirmed to be the signator.

3. The method of claim 1, wherein the first ink on paper signature is not consistent with the second ink on paper signature and the individual is confirmed not to be the signator.

4. The method of claim 1, wherein the first electronic signature is consistent with the second electronic signature and the individual is confirmed to be the author of the first electronic signature.

5. The method of claim 1, wherein the first electronic signature is not consistent with the second electronic signature and the individual is confirmed not to be the author of the first electronic signature.

6. The method of claim 1, wherein the transaction is a commercial transaction.

7. The method of claim 1, wherein the transaction is a legal transaction.

8. The method of claim 1, wherein the transaction comprises the execution of a will.

9. A method of verifying whether a first electronic signature obtained in connection with a transaction is that of a signator, comprising the steps of:
    (a) obtaining a first ink on paper signature from the signator for reference;
    (b) obtaining, in a single step using a touch sensitive pad connected to a computer, a second ink on paper signature and a second electronic signature from an individual, wherein the second ink on paper signature and the second electronic signature are identical;
    (c) comparing the first ink on paper signature with the second ink on paper signature to determine whether the first ink on paper signature is consistent with the second ink on paper signature and thereby verify whether the individual is the signator; and
    (d) comparing the first electronic signature with the second electronic signature to determine whether the first electronic signature is consistent with the second electronic signature and thereby verify whether the individual is the author of the first electronic signature.

10. A method of verifying whether a disputed electronic signature is that of a signator, comprising the steps of:
    (a) obtaining a first electronic signature in connection with a transaction, the first electronic signature being the disputed electronic signature;
    (b) obtaining a first ink on paper signature from the signator for reference;
    (c) obtaining, in a single step using a touch sensitive pad connected to a computer, a second ink on paper signature and a second electronic signature from an individual, wherein the second ink on paper signature and the second electronic signature are identical;
    (d) comparing the first ink on paper signature with the second ink on paper signature to determine whether the first ink on paper signature is consistent with the second ink on paper signature and thereby verify whether the individual is the signator; and
    (e) comparing the first electronic signature with the second electronic signature to determine whether the first electronic signature is consistent with the second electronic signature and thereby verify whether the individual is the author of the first electronic signature.

11. The method of claim 1 wherein step (c), the step of obtaining in a single step using a touch sensitive pad connected to a computer, a second ink on paper signature and a second electronic signature from an individual, wherein the second ink on paper signature and the second electronic signature are identical, is carried out with the use of an electronic pen having a built-in ink cartridge.

12. The method of claim 9 wherein step (b), the step of obtaining, in a single step using a touch sensitive pad connected to a computer, a second ink on paper signature and a second electronic signature from an individual, wherein the second ink on paper signature and the second electronic signature are identical, is carried out with the use of an electronic pen having a built-in ink cartridge.

13. The method of claim 10 wherein step (c), the step of obtaining, in a single step using a touch sensitive pad connected to a computer, a second ink on paper signature and a second electronic signature from an individual, wherein the second ink on paper signature and the second electronic signature are identical, is carried out with the use of an electronic pen having a built-in ink cartridge.

* * * * *